(12) United States Patent
Coxon

(10) Patent No.: US 11,046,050 B2
(45) Date of Patent: Jun. 29, 2021

(54) FABRICATION OF COMPOSITE LAMINATES USING TEMPORARILY STITCHED PREFORMS

(71) Applicant: The Boeing Company, Chicago, IL (US)

(72) Inventor: Brad Andrew Coxon, Everett, WA (US)

(73) Assignee: The Boeing Company, Chicago, IL (US)

( * ) Notice: Subject to any disclaimer, the term of this patent is extended or adjusted under 35 U.S.C. 154(b) by 60 days.

(21) Appl. No.: 15/622,444

(22) Filed: Jun. 14, 2017

(65) Prior Publication Data

US 2017/0274621 A1 Sep. 28, 2017

Related U.S. Application Data

(62) Division of application No. 14/219,737, filed on Mar. 19, 2014.

(51) Int. Cl.
| | |
|---|---|
| *B32B 7/08* | (2019.01) |
| *B29C 70/48* | (2006.01) |
| *B29C 70/22* | (2006.01) |
| *D04H 3/115* | (2012.01) |
| *B29C 65/78* | (2006.01) |

(Continued)

(52) U.S. Cl.
CPC ............... *B32B 7/08* (2013.01); *B29C 65/02* (2013.01); *B29C 65/40* (2013.01); *B29C 65/7855* (2013.01); *B29C 66/1122* (2013.01); *B29C 66/45* (2013.01); *B29C 66/72141* (2013.01); *B29C 70/226* (2013.01); *B29C 70/42* (2013.01); *B29C 70/48* (2013.01); *B32B 5/02* (2013.01); *B32B 27/08* (2013.01); *D04H 3/115* (2013.01); *B29C 65/62* (2013.01); *B29C 66/71* (2013.01); *B29C 66/73752* (2013.01); *B29C 66/73941* (2013.01); *Y10T 428/24826* (2015.01)

(58) Field of Classification Search
CPC ..... B32B 7/08; B29C 66/45; B29C 66/72141; B29C 65/40; B29C 70/48; D04H 3/115
See application file for complete search history.

(56) References Cited

U.S. PATENT DOCUMENTS

| | | | |
|---|---|---|---|
| 3,842,628 A | 10/1974 | Bennett | |
| 4,913,937 A * | 4/1990 | Engdahl | B29C 70/24 427/314 |

(Continued)

FOREIGN PATENT DOCUMENTS

| | | |
|---|---|---|
| EP | 2666617 A1 | 11/2013 |
| JP | H8-509921 A | 10/1996 |

(Continued)

OTHER PUBLICATIONS

Japanese Patent Office Notification of Reasons for Rejection with English Translation, dated Jan. 29, 2019, regarding Application No. JP2015-043434, 8 pages.

(Continued)

*Primary Examiner* — Michael N Orlando
*Assistant Examiner* — Jaeyun Lee
(74) *Attorney, Agent, or Firm* — Yee & Associates, P.C.

(57) ABSTRACT

A composite structure is fabricated using a preform comprising a stack of unidirectional prepreg plies that are stitched together. During curing of the prepreg, the stitches melt and dissolve.

20 Claims, 8 Drawing Sheets

(51) Int. Cl.
- B29C 65/00 (2006.01)
- B29C 65/02 (2006.01)
- B29C 65/40 (2006.01)
- B29C 70/42 (2006.01)
- B32B 5/02 (2006.01)
- B32B 27/08 (2006.01)
- B29C 65/62 (2006.01)

(56) References Cited

U.S. PATENT DOCUMENTS

| | | | |
|---|---|---|---|
| 5,248,711 A * | 9/1993 | Buyny | C08J 5/24 523/500 |
| 5,368,922 A * | 11/1994 | Portelli | C08J 5/24 442/149 |
| 5,436,064 A | 7/1995 | Schnegg et al. | |
| 5,931,107 A * | 8/1999 | Thrash | D05B 47/04 112/254 |
| 6,123,043 A * | 9/2000 | Cahuzac | B29C 70/24 112/440 |
| 6,450,450 B1 | 9/2002 | MacDonald et al. | |
| 6,752,190 B1 * | 6/2004 | Boll | B29B 15/08 156/173 |
| 7,073,538 B2 | 7/2006 | Bhatnagar et al. | |
| 7,198,739 B2 | 4/2007 | La Forest et al. | |
| 8,312,827 B1 | 11/2012 | Free | |
| 2004/0041128 A1 | 3/2004 | Carter | |
| 2004/0113317 A1 | 6/2004 | Healey et al. | |
| 2010/0283180 A1 * | 11/2010 | De Vita | B29C 67/0037 264/258 |
| 2012/0108132 A1 * | 5/2012 | Fang | C08J 5/24 442/167 |
| 2014/0174641 A1 | 6/2014 | Roman et al. | |
| 2015/0266268 A1 | 9/2015 | Coxon | |

FOREIGN PATENT DOCUMENTS

| | | | |
|---|---|---|---|
| JP | 2002-227066 A | 8/2002 |
| JP | 2004-506799 A | 3/2004 |
| WO | WO9426492 A1 | 11/1994 |
| WO | WO02057527 A1 | 7/2002 |

OTHER PUBLICATIONS

Australian Government Patent Office Examination Report No. 1 for Standard Patent Application, dated Mar. 4, 2019, regarding Application No. 2018204632, 4 pages.
China National Intellectual Property Administration Decision of Rejection, with English Translation, dated Apr. 10, 2019, regarding Application No. 2015100610543, 10 pages.
Office Action, dated Jun. 16, 2017, regarding U.S. Appl. No. 14/219,737, 22 pages.
Final Office Action, dated Oct. 27, 2017, regarding U.S. Appl. No. 14/219,737, 32 pages.
European Patent Office Examination Report, dated Apr. 21, 2017 regarding Application No. EP15159664.0, 6 pages.
Extended European Search Report, dated Aug. 20, 2015, regarding Application No. EP15159664.0, 10 pages.
"Stitch-Bonded Reinforcements," Vectorply Corporation, Vectorply Performance Composite Reinforcements, 4 pages, accessed Mar. 6, 2014. http://www.vectorply.com/ri-101.html.
Cripps, "Multiaxial Fabrics," NetComposites, copyright 2014, 2 pages, accessed Mar. 6, 2014. http://www.netcomposites.com/guide/multiaxial-fabrics/42.
Shekar, "Advancement in FRP Composites Using 3-D Stitched Fabrics and Enhancement in FRP Bridge Deck Component Properties," Masters Thesis, West Virginia University, copyright 2000, 156 pages.
Office Action, dated Sep. 6, 2016, regarding U.S. Appl. No. 14/219,737, 28 pages.
Final Office Action, dated Feb. 9, 2016, regarding U.S. Appl. No. 14/219,737, 22 pages.
Office Action, dated Mar. 21, 2018, regarding U.S. Appl. No. 14/219,737, 27 pages.
Final Office Action, dated Aug. 9, 2018, regarding U.S. Appl. No. 14/219,737, 37 pages.
Australian Government Examination Report No. 1 for Standard Patent Application, dated Feb. 9, 2018, regarding Application No. 2015200414, 3 pages.
State Intellectual Property Office of PRC First Notification of Office Action, dated Feb. 24, 2018, regarding Application No. 201510061054.3, 16 pages.
Patent Office of the Cooperation Council for the Arab States of the Gulf Examination Report, dated Feb. 13, 2018, regarding Application No. GC 2015-29070, 4 pages.
Brazilian Office Action with English translation, dated Dec. 6, 2019, regarding Application No. BR102015003582-9, 7 pages.
Australian Government Patent Office Examination Report No. 2 for Standard Patent Application, dated Feb. 28, 2020, regarding Application No. 2018204632, 3 pages.
Office Action, dated May 14, 2020, regarding U.S. Appl. No. 14/219,737, 37 pages.
Final Office Action dated Oct. 1, 2020 regarding U.S. Appl. No. 14/219,737; 30 pgs.
China National Intellectual Property Administration Second Notification of Office Action and English translation, dated Nov. 5, 2018, regarding Application No. 20150061054.3, 12 pages.
Office Action, dated Jan. 25, 2019, regarding U.S. Appl. No. 14/219,737, 32 pages.
China National Intellectual Property Administration Notification of Reexamination, with English translation, dated Apr. 1, 2021, regarding Chinese Application No. 20150061054.3, 18 pages.
Korean Office Action, with English translation, dated Feb. 20, 2021, in regards to Korean Application No. 10-2015-0009780, 10 pages.

* cited by examiner

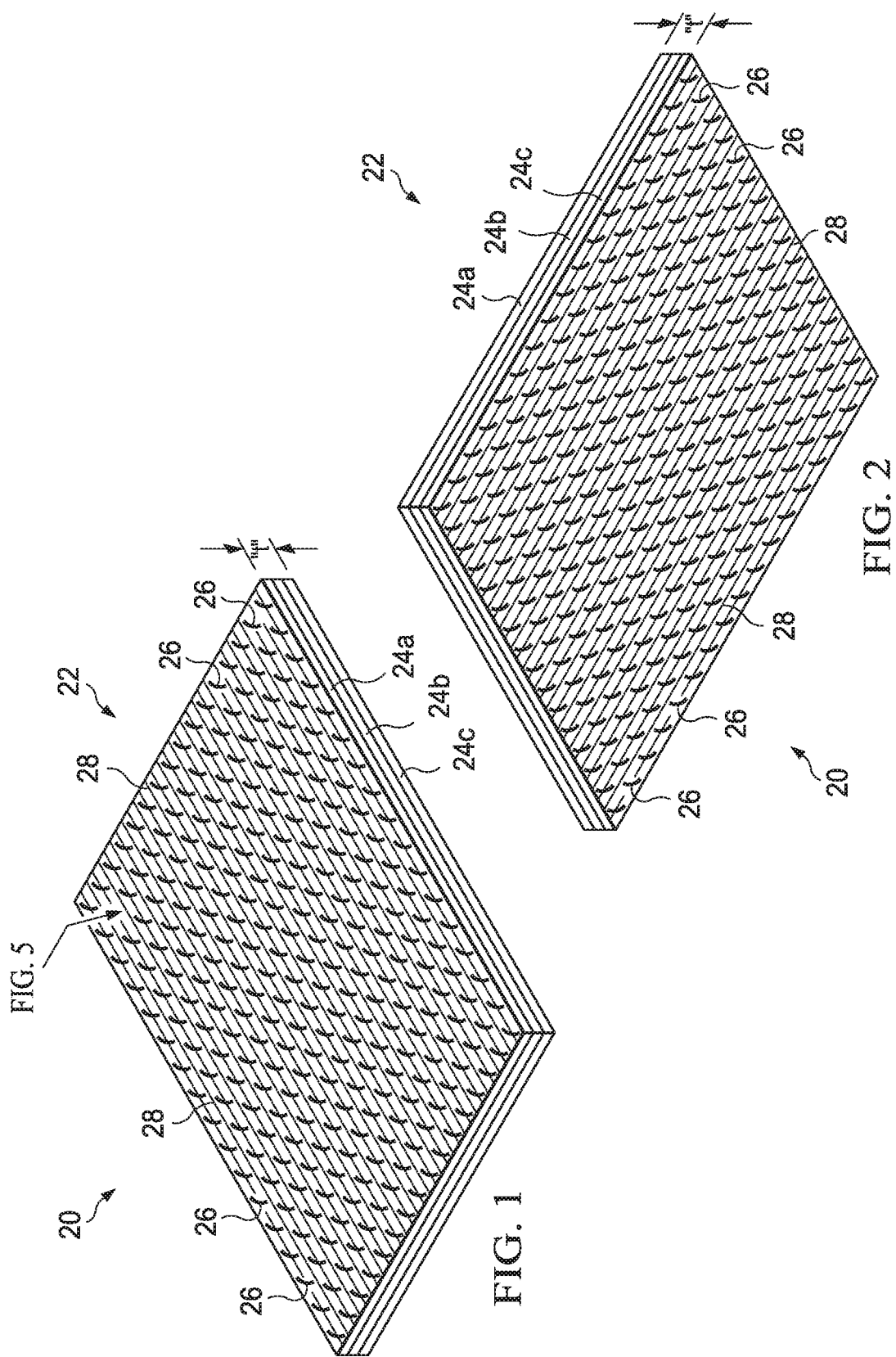

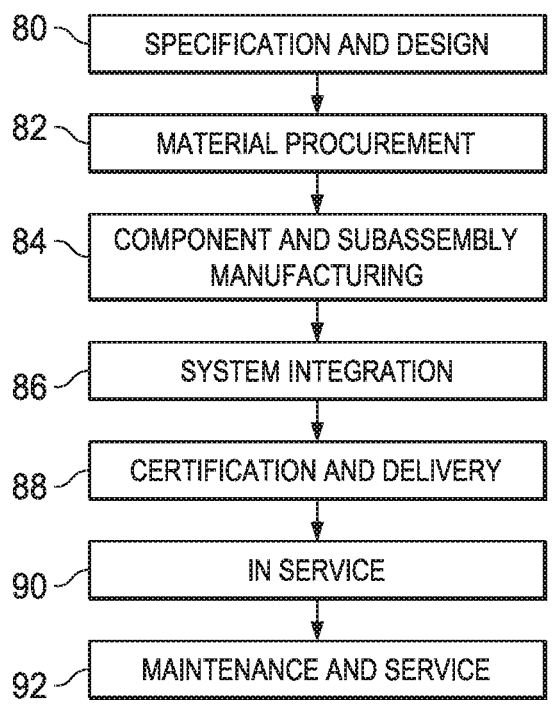
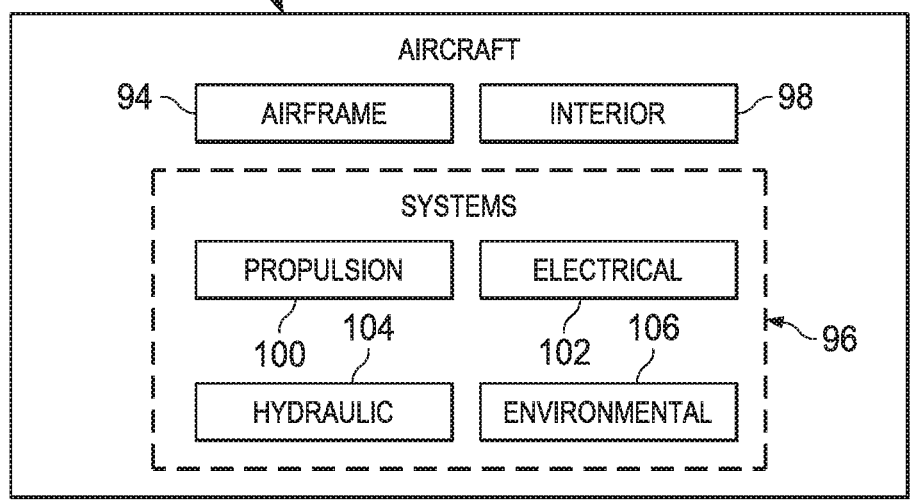

FABRICATION OF COMPOSITE LAMINATES USING TEMPORARILY STITCHED PREFORMS

This application is a divisional of and claims the benefit of priority to U.S. patent application Ser. No. 14/219,737, filed Mar. 19, 2014, the entire contents of which are incorporated herein by reference.

BACKGROUND INFORMATION

1. Field

The present disclosure generally relates to preforms used in the fabrication of composite laminate structures, and deals more particularly with a temporarily stitched preform.

2. Background

High performance composite structures may be fabricated by laying up plies of prepreg or by resin infusion of dry fibers. The fibers may be in unidirectional, woven or braided fabric form. In some applications, in order to reduce layup time, adjacent plies of the fabric may be co-stitched together using stitch material that remains with the completed structure after the structure is cured. Stitching the plies together allows the plies to the laid up on a tool in ply groups, rather than one-by-one, thereby increasing efficiency of the layup process. Co-stitched fabric plies formed from unidirectional reinforcement fibers are relatively formable, making them well-suited for forming highly contoured structures, however structures fabricated using stitched plies may have less than the desired level of strength and crack resistance.

Accordingly, there is a need for a method of fabricating composite structures using co-stitched plies of fabric which reduces or eliminates the presence of stitch material in the cured structure. There is also a need for a preform used in the fabrication of such structures that can be assembled using a co-stitched, multi-layer prepreg, or co-stitched fiber layers suitable for resin infusion.

SUMMARY

The disclosed embodiments provide a method of fabricating a composite laminate structure using a co-stitched multi-layer preform. In one embodiment, the preform is formed by stitching together plies of unidirectional prepreg using stitch material that melts during curing of the prepreg. In another embodiment, the preform is formed by stitching together multiple fiber layers using stitch material that melts during curing of resin used to infuse the fiber layers. Melting of the stitch material during the cure process effectively dissolves the stitches and avoids possible crimping between the stitches and the reinforcing fibers. Dissolution of the stitches reduces or eliminates stress concentrations in the cured structure caused by fiber crimping, thereby improving the mechanical performance of the composite laminate structure while reducing the possibility of crack propagation through the laminate. The use of a co-stitched multi-ply preform may increase production efficiency by allowing simultaneous layup and forming of multiple layers of fiber reinforcements.

According to one disclosed embodiment, a method is provided of fabricating a composite structure. Prepreg plies are stitched together into a stitched stack of prepreg plies having varying fiber orientations, and the stitched stack of prepreg plies is thermally cured. The stitching melts during thermal curing of the stitched stack of prepreg plies. The method may further comprise assembling the prepreg plies into a stack, wherein each of the prepreg plies has resin tack, and assembling the prepreg plies into the stack includes using the resin tack to adhere the plies together and maintain the fiber orientations of the prepreg plies during the stitching. Stitching the prepreg plies together is performed by using stitches that pass substantially through the thickness of the stack. Assembling the prepreg plies into a stack includes laying down prepreg tows, and varying the fiber orientations of the tows for each of the plies. The method may also comprise debulking, consolidating and curing the stitched stack under a vacuum. Melting the stitching is performed before the stitched stack of prepreg plies is fully cured. The method may further comprise forming the stitched stack of prepreg plies into a desired shape corresponding to the shape of the composite structure.

According to another embodiment, a method is provided of making a composite preform. A stack of prepreg plies is assembled, wherein each of the plies includes reinforcing fibers held in a thermally curable resin matrix. The prepreg plies are stitched together after the stack has been assembled. The stitching is performed using stitching material that melts during thermal curing of the prepreg plies. Assembling the stack of prepreg plies includes maintaining the plies in registration relative to each other by tacking the plies together. Tacking the plies together is performed using tack of the resin matrix in each of the plies. Assembling the stack of prepreg plies includes using the resin matrix in each of the prepreg plies to hold the reinforcing fibers in the plies in spaced relationship to each other during the stitching. The stitching includes placing stitches substantially completely through the thickness of the stack of prepreg plies. The stack may be assembled by laying prepreg tows, and the stitching may be carried out by placing stitches between the prepreg tows that pass substantially completely through the stack of prepreg plies. During assembly of the stack, the plies are oriented such that they have differing fiber orientations.

According to still another embodiment, a composite preform is provided. The preform comprises a stack of unidirectional prepreg plies having varying fiber orientations. Stitches passing through all of the prepreg plies in the stack hold the plies together. The stitches are formed of a stitching material capable of melting during thermal curing of the prepreg plies. Each of the prepreg plies includes prepreg tows, and the stitches pass between the prepreg tows. The stitches may be distributed generally uniformly across the stack of unidirectional prepreg plies. Each of the prepreg plies includes a resin matrix, and the stitching material is compatible with the resin matrix. The resin matrix may be a thermoset resin, and the stitching material may be a thermoplastic resin. The thermoset resin has a cure temperature at which the thermoset resin is fully cured, and the thermoplastic resin has a melt temperature that is below the cure temperature of the thermoset resin.

According to still another embodiment, a method is provided of fabricating a composite structure. Dry fiber plies are stitched together into a stitched stack of dry fiber plies having varying fiber orientations. The stack of dry fiber plies is infused with a polymer resin. The resin infused stack is thermally cured. The stitching melts during thermal curing of the stitched stack. The method may also include debulking, consolidating and curing the stitched stack under a vacuum. Stitching the dry fiber plies together is performed using stitches that pass substantially through the entire thickness of the stack. The method may also comprise applying a tackifier to each of the dry fiber plies, and assembling the dry fiber plies into a stack, including using the tackifier to adhere the dry fiber plies together and maintain the fiber orientations of the dry fiber plies during the stitching. Assembling the dry fiber plies into a stack includes laying down dry fiber tows, and varying the fiber orientations of the dry fiber tows for each of the dry fiber plies. The method may further comprise forming the stitched stack of dry fiber plies into a desired shape corresponding to the shape of the composite structure. The forming may be performed by forming the stitched stack of dry fiber plies onto a tool such as a mold.

According to another embodiment, a method is provided of making a dry fiber preform. The method comprises assembling a stack of dry fiber plies, each of which includes unidirectional reinforcing fibers. The dry fiber plies are stitched together after the stack has been assembled. The stitching is performed using stitches that pass through the stack and melt when they have been heated to a predetermined temperature. The method may also include applying a tackifier to each of the dry fiber plies, and assembling the stack of dry fiber plies includes using the tackifier to maintain the plies in registration relative to each other.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is an illustration of a top perspective view of a stitched preform.

FIG. 2 is an illustration of a bottom perspective view of the stitched preform shown in FIG. 1.

FIG. 12 is an illustration of a flow diagram of aircraft production and service methodology.

FIG. 13 is an illustration of a block diagram of an aircraft.

DETAILED DESCRIPTION

Figure 3:
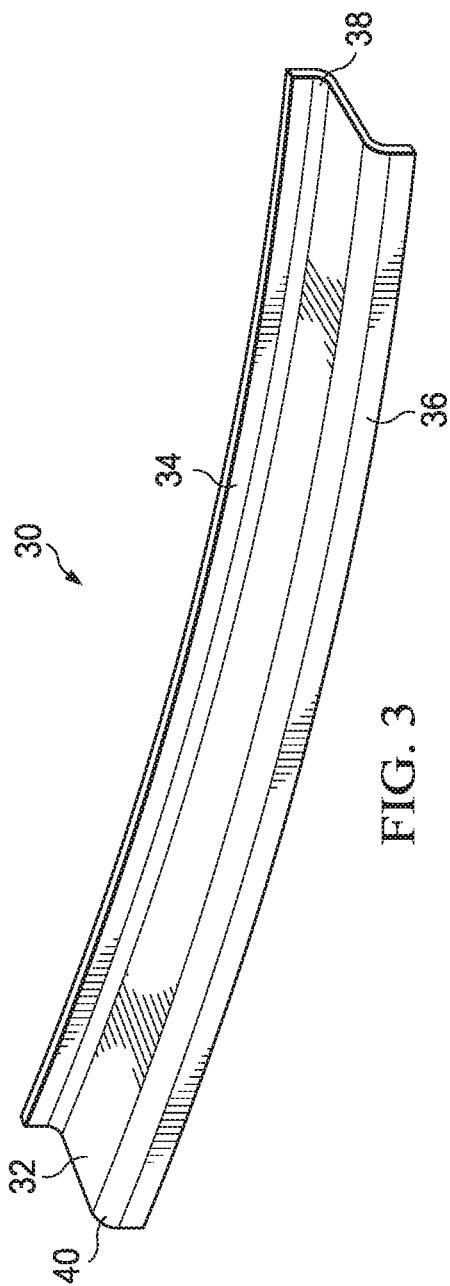
FIG. 3 is an illustration of a perspective view of a curved frame section that may be fabricated using a stitched preform.

Referring to FIGS. 1 and 2, a composite preform 20 comprises a stitched stack 22 of prepreg plies 24a, 24b, 24c each of which has unidirectional reinforcement in the form of fiber tows 28. The prepreg plies 24a, 24b, 24c in the stack 22, sometimes also referred to herein as "layers", are tacked together by stitches 26 that extend through the thickness of the stack 22. Only the top and bottom of the stitches 26 are shown, respectively, in FIGS. 1 and 2. The preform 20 may be used to fabricate any of a variety of composite structures, particularly those having simple or compound contours. For example, referring to FIG. 3, the preform 20 may be employed to fabricate a unitary composite frame section 30 by forming the stack 22 of prepreg plies 24a, 24b, 24c using suitable tooling (not shown), either before or after the prepreg plies 24a, 24b, 24c are stitched together. In this example, the frame section 30 is curved along its length and comprises a curved inner chord flange 34, a curved outer chord flange 36 and a web 32. The flanges 34, 36 transition into the web along radius corners 38, 40 which have compounded curvatures. The frame section 30 is merely illustrative of a wide range of composite laminate structures that may be fabricated using the disclosed preform 20. The frame section 30 shown in FIG. 3 has a Z-shaped cross section, however other cross-sectional shapes are possible.

Figure 4:
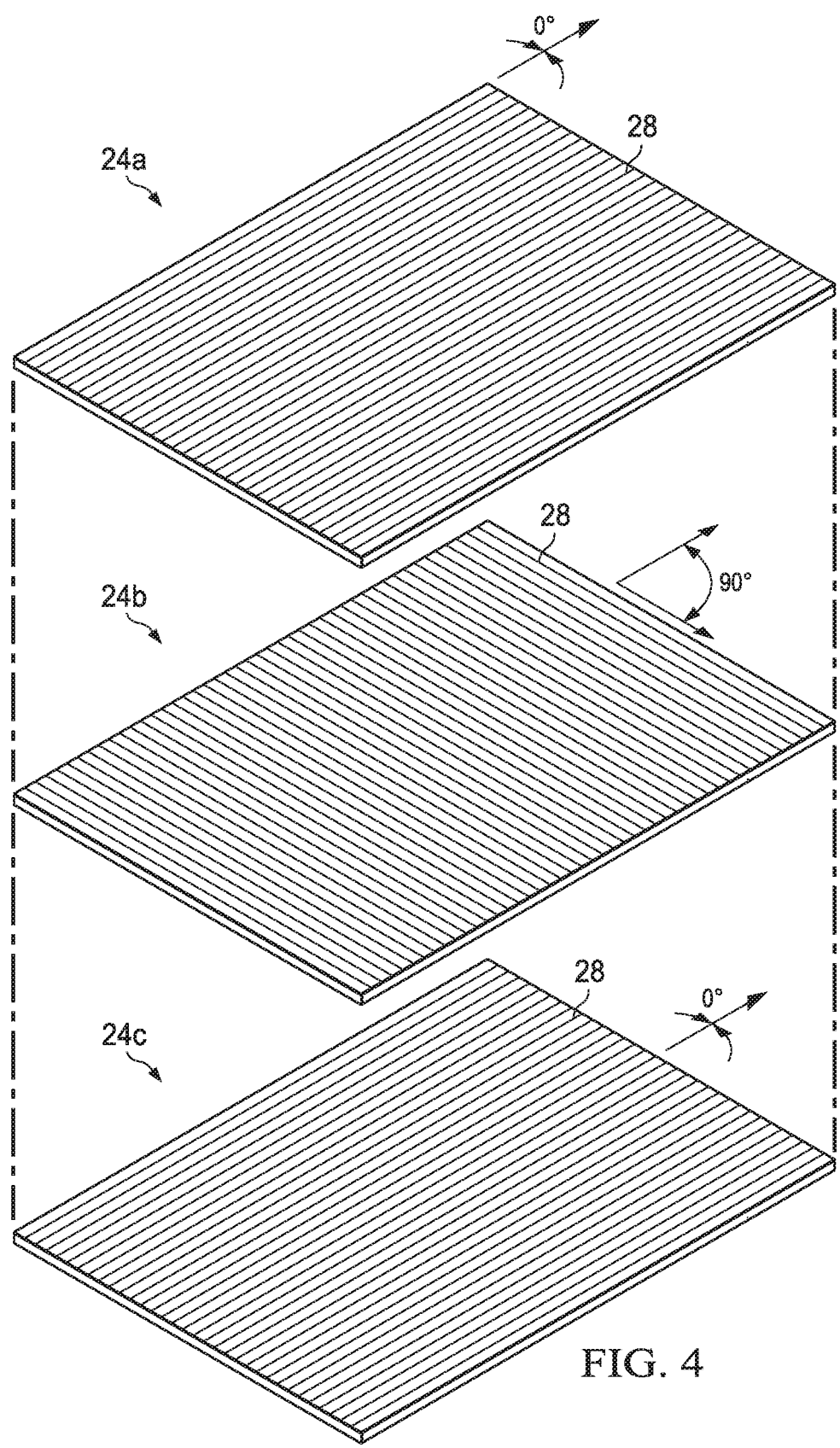
FIG. 4 is an illustration of an exploded, perspective view of the stitched preform of FIG. 1, showing the individual layers of the preform and their respective fiber orientations.

Referring particularly to FIGS. 1, 2 and 4, although three plies 24a, 24b, 24c are shown in the exemplary embodiment, the stack 22 may comprise as few as two or greater than three plies 24, depending upon the application. In the embodiment illustrated in FIGS. 1, 2 and 4, each of the plies 24a, 24b, 24c comprises a plurality of unidirectional prepreg tows 28 that may be placed in multiple, side-by-side bandwidths (not shown) by automatic fiber placement equipment (not shown) or by other techniques. However, as will be discussed later, the stitched stack 22 may comprise a stitched stack of dry fiber layers 24a, 24b, 24c of unidirectional dry fibers that may be in the form of tows, unidirectional tape, cut patterns of unidirectional reinforcement or other forms.

The prepreg tows 28 each comprise a bundle of individual reinforcing fibers (not shown) that is pre-impregnated with a suitable resin which will be discussed later in more detail. Each of the plies 24a, 24b, 24c may have any desired fiber orientation, but in the illustrated example shown in FIG. 4, respectively have 0°, 90° and 0° fiber orientations. In one embodiment, the prepreg tows 28 may have a generally circular cross-sectional shape (see FIG. 6), while in another embodiment, the prepreg tows 28 may have a generally flat cross-sectional shape (not shown), sometimes referred to as a "flat tow" or a "spread tow".

The resin used to impregnate the tows 28 may comprise a thermally curable resin that is suitable for the application and has a desired cure temperature. For example and without limitation, the reinforcing fibers may comprise carbon and the resin used as the matrix may comprise a thermally curable thermoset resin such as epoxy. Other types of reinforcing fibers are possible, such as without limitation, metal, ceramic and/or glass fibers. Other types of resins may be employed as the matrix, depending upon the application, such as, without limitation polyester resins, vinyl ester resins, phenolic resins, polyimide resins, PBI (polybenzimidazole) resins, and BMI (bismaleimide) resins.

The presence of resin impregnated into the tows 28 causes the tows 28, and thus the plies 24a, 24b, 24c to have resin tack, and this resin tack causes the plies 24a, 24b, 24c to adhere to each other when they are laid up on top of each other. The adhesion provided by the resin tack holds the plies 24a, 24b, 24c in registration with each other and in their desired ply orientations during subsequent processing discussed below in more detail. The matrix resin also holds the tows 28 of the plies 24 in spaced relationship to each other through the thickness "t" of the stack 22. In some applications, it may be necessary or desirable to apply a tackifier to the plies 24a, 24b, 24c to increase the adhesion between the plies 24a, 24b, 24c. Similarly, where the tows 28 are dry (not impregnated with resin), a tackifier, sometimes referred to as a binder, may be used to adhere the layers 24a, 24b, 24c together and maintain their respective fiber orientations until the stitched stack 22 can be formed into a desired shape.

The stitches 26 pass between the tows 28 and hold the plies 24a, 24b, 24c in their desired ply orientations. The number, density, size, spacing and type of the stitches used will depend upon the application. Similarly, the tightness of the stitches 26 may vary, depending upon the number of plies 24 in the stack 22 and the complexity of the composite structure being fabricated. For example, where the composite structure is highly contoured, it may be desirable to employ relatively loose stitches 26 in order to allow the plies 24a, 24b, 24c to slip slightly in-plane relative to each other as they are being formed over tooling. Slight in-plane slippage between the plies 24a, 24b, 24c may allow the stack 22 to better conform to contoured tool surfaces and avoid ply wrinkling and/bunching.

Figure 5:
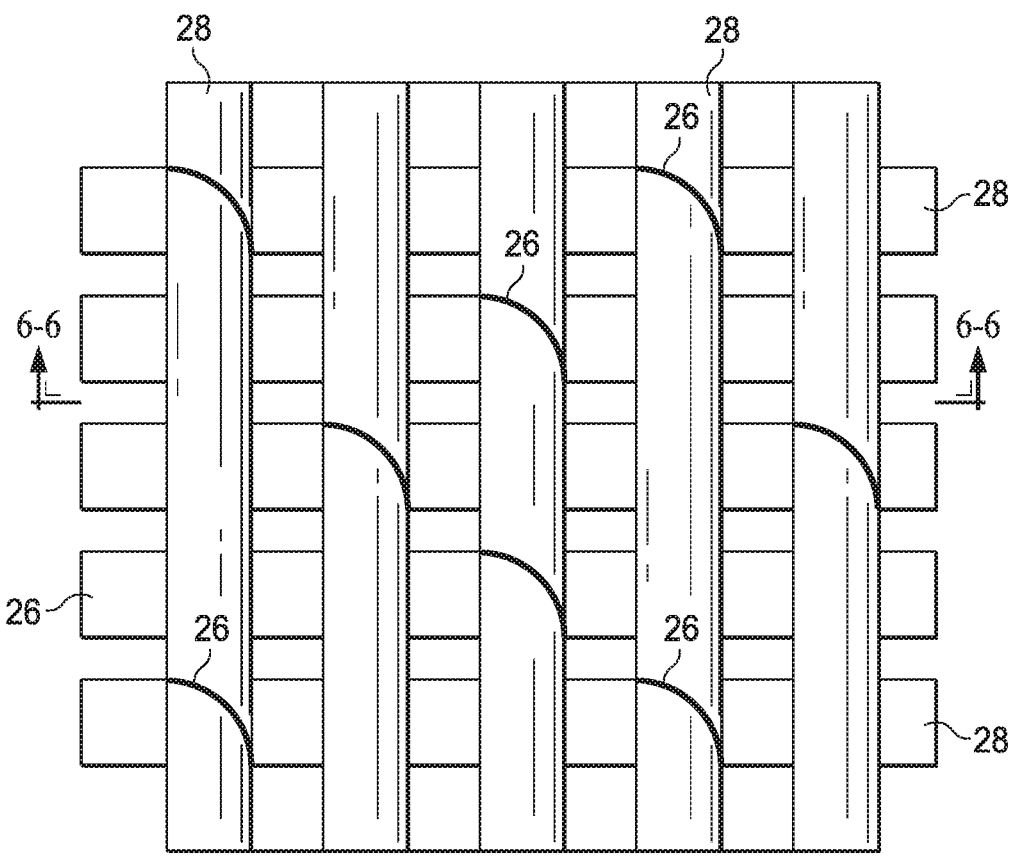
FIG. 5 is an illustration of a plan view of the area designated as "FIG. 5" in FIG. 1.
Figure 6:
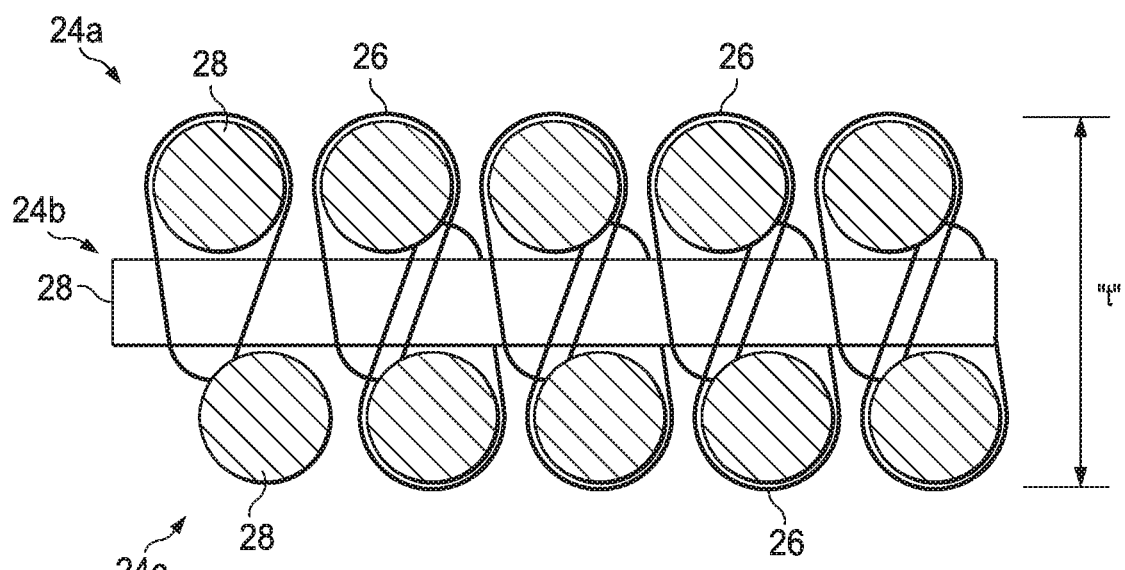
FIG. 6 is an illustration of a sectional view taken along the line 6-6 in FIG. 5.

Referring now particularly to FIGS. 5 and 6, any of various types of stitches 26 may be employed to stitch the plies 24a, 24b, 24c together provided that the stitches 26 pass through substantially the entire thickness "t" (FIG. 1) of the stack 22, between any adjacent tows 28 in each of the plies 24a, 24b, 24c. In the illustrated embodiment, the stitches 26 are effectively looped around the tows 28, and extend diagonally across the stack 22. However, in other embodiments, the stitches 26 may not be looped around all of the tows 28, and may extend in any direction across the stack 22. The stitches 26 may be formed and spaced apart from each other in any of a variety of manners, providing that they adequately hold the plies 24a, 24b, 24c together as the stack 22 is being formed over tooling (not shown) employed to shape the stack 22 into the desired shape of the composite structure. In some embodiments, however, it may be possible to stitch the plies 24a, 24b, 24c together after the stack 22 has been formed into a desired shape.

The material from which the stitches 26 is formed (hereinafter "stitch material") may comprise any of a variety of polymer resins that is compatible with the matrix resin of the tows 28, and which has a melt temperature that results in melting of the stitches 26 during thermal curing of the matrix resin. For example, the stitch material may comprise a thermoplastic resin such as, without limitation, PEI (polyetherimide) PPS (polyphenylene sulphide), PES (polyethersulfone), PEEK (polyetheretherketone), PEKK (polyetheretherketone), and PEKK-FC (polyetherketoneketone-fc grade), which has a relatively low melt temperature that is within the range of temperatures required to cure the matrix resin. For example, where the matrix resin is an epoxy that cures at approximately 180° C., the stitch material may comprise a thermoplastic resin having a low melt temperature in the range of 150° C. In this example, the thermoplastic resin melts and combines with the flowable thermoset resin before the thermoset resin begins to substantially cure and harden. In one embodiment, a thermoplastic stitch material is selected which remains intact to provide the necessary support of the plies 24a, 24b, 24c, 24d as the matrix resin melts and initially becomes flowable. The thermoplastic stitch material may begin to melt and dissolve into the matrix resin 44 only after the viscosity of the matrix resin 44 begins to increase as the matrix resin 44 begins to harden during its initial stage of curing. Consolidation of the composite laminate structure is accomplished under vacuum which is used to debulk the plies 24a, 24b, 24c and hold the plies 24a, 24b, 24c together without movement while the stitches 26 melt into the resin and the structure cures-consolidates.

Figure 7:
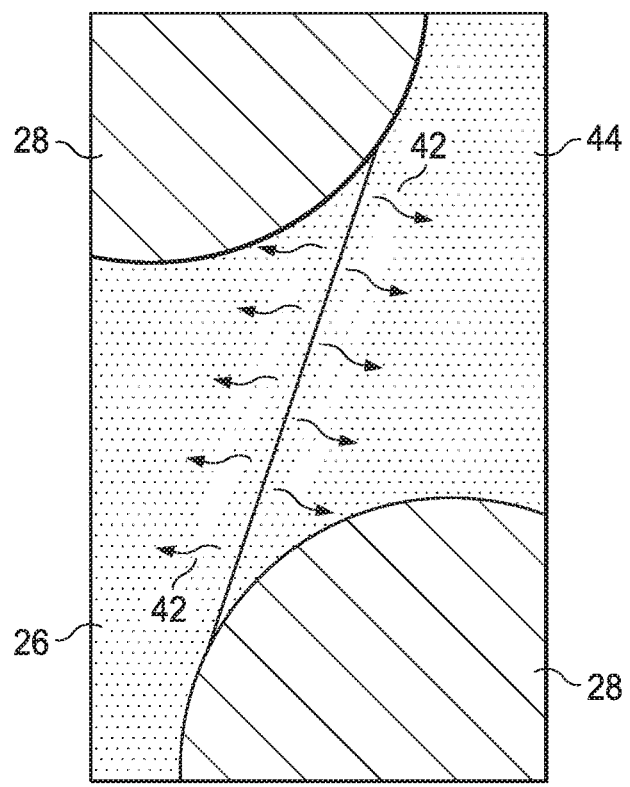
FIG. 7 is an illustration of a sectional view showing a portion of a stitch between two tows at an early stage of curing.
Figure 8:
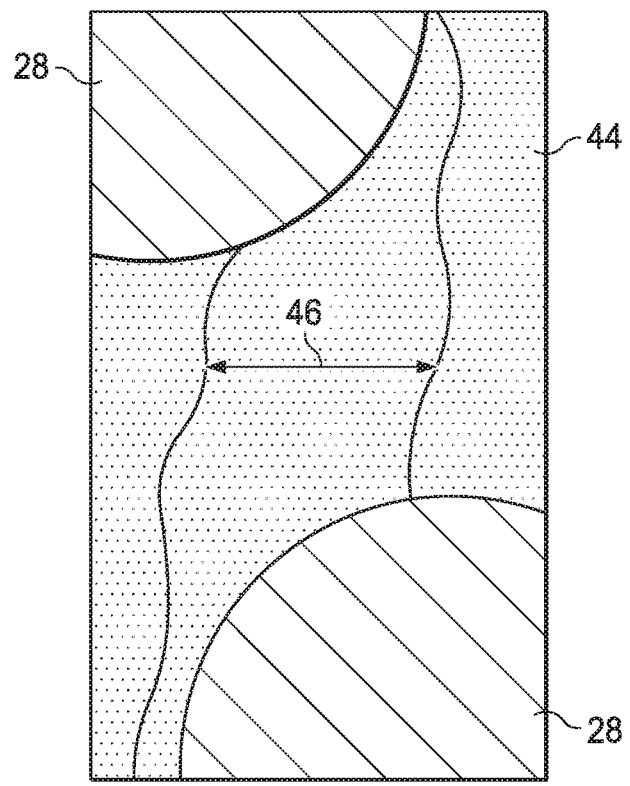
FIG. 8 is an illustration similar to FIG. 7, but showing the stitch having melted into the surrounding matrix resin during a later stage of the curing.

FIG. 7 illustrates a cross-sectional side view of one of the stitches 26 during an early stage of a cure cycle in which the formed composite laminate structure is cured and consolidated by subjecting it to heat and pressure applied by a vacuum bag and/or an autoclave. The combination of applied heat and pressure causes the matrix resin 44 to begin to flow, and consolidate the plies 24a, 24b, 24c. The resin flow comes from the matrix resin 44 that is impregnated into the tows 28. At this point in the cure cycle, the stitches 26 have not yet been heated to their melt temperature, and therefore remain intact. As the temperature is further increased during the cure cycle however, the stitch material begins to melt and flow 42 into the surrounding matrix resin 44 which is still flowable, until, as shown in FIG. 8, the stitch material is fully dissolved within regions 46 of the matrix resin 44. The applied pressure aids in causing the stitch material and the matrix resin 44 to flow together and mix with each other. Depending upon the particular polymer resin selected for use as stitches 26, the dissolved stitch material may assist in toughening the matrix resin 44, and may increase mechanical properties, such as impact resistance, of the cured composite structure.

Figure 9:
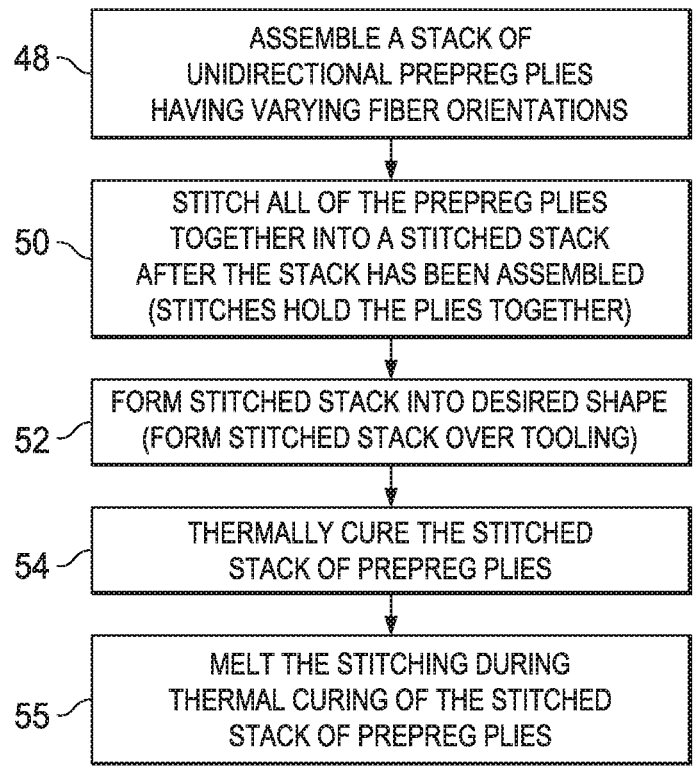
FIG. 9 is illustration of a flow diagram of a method of fabricating a composite structure using a stitched prepreg preform.

Attention is now directed to FIG. 9 which broadly illustrates the overall steps of a method of fabricating a composite laminate structure using a stitched prepreg. Beginning at step 48, a stack 22 of unidirectional prepreg plies is assembled wherein plies may have varying fiber orientations. Then at step 50, after the prepreg plies having been assembled into a stack 22, the stack 22 may be formed into a desired shape using tooling or other forming techniques. In some embodiments, however it may be possible to layup the preform 20 in a particular stack shape and then stitch the plies of the preform 20 together. In other words, the stitching of step 50 may be carried out after the forming of step 52. At step 54, the stitched and formed stack 22 is thermally cured, as by placing the stack into an oven or an autoclave. At 55, during thermal curing of the stitched stack 22, the stitching material that melts, causing the stitches to dissolve into the surrounding matrix resin 44 undergoing curing.

Figure 10:
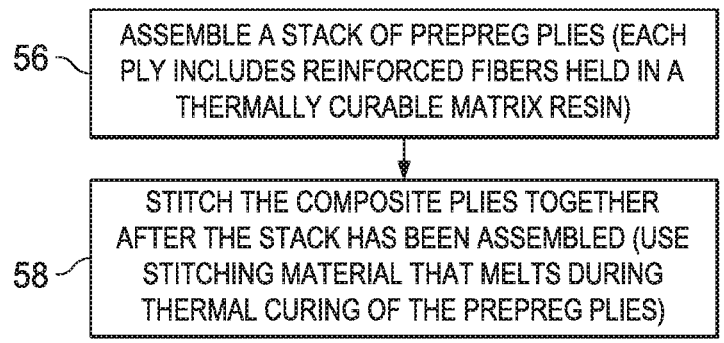
FIG. 10 is an illustration of a flow diagram of a method of fabricating a stitched prepreg preform.

FIG. 10 broadly illustrates the overall steps of a method of making a prepreg preform 20 using prepreg plies that are stitched together with stitching material that melts during subsequent curing of the prepreg. At step 56, a stack 22 of prepreg plies is assembled. Each of the plies includes reinforcing fibers held in a thermally curable matrix resin 44. At step 58, the prepreg plies are stitched together after the stack has been assembled, using a stitching material that melts and dissolves during thermal curing of the prepreg plies.

Referring again to FIGS. 1 and 2, as previously mentioned, in an alternate embodiment, the preform 20 may be a dry fiber preform suitable for use in any of various types of resin infusion processes in which the preform serves as a reinforcement that is infused with resin. In this embodiment, the preform 20 comprises a stitched stack 22 of the layers 24a, 24b, 24c, each of which is formed by a unidirectional dry fiber reinforcement such as fiber tows (FIGS. 5 and 6) or unidirectional dry fiber tape.

The layers 24a, 24b, 24c have varying fiber orientations relative to each other. The fiber tows 28 used in the dry fiber preform 20 may comprise one or more materials similar to the materials discussed above that may be used to produce the fiber tows 28 of the prepreg embodiment of the preform 20. The dry fiber layers 24a, 24b, 24c are temporarily stitched together by stitches 26 (FIGS. 5 and 6) that pass completely through the thickness "t" (FIG. 6). The stitches 26 hold the layers 24a, 24b, 24c together as a preform, but may be lose enough to allow the layers 24a, 24b, 24c to slip slightly relative to each other when the preform 20 is formed down onto contoured surfaces of a tool (not shown) used in a resin infusion process. As previously mentioned, in some embodiments, the dry fiber layers 24a, 24b, 24c may be formed into a desired shape before the dry fiber layers 24a, 24b, 24c are stitched together into a preform 20.

The stitches 26 assist in holding the layers 24a, 24b, 24c in their desired orientations and in spaced apart relationship to each other as the preform 20 is debulked, consolidated and infused with resin. By maintaining the dry fiber layers 24a, 24b, 24c in their desired orientations and spatial relationships until the matrix resin begins to harden with the onset of curing, the reinforcement of the cured composite structure may be more uniformly distributed and therefore contribute to improving the mechanical performance of the composite structure.

As in the previous prepreg preform 20 example, the material from which the stitches 26 are formed may comprise any of a variety of polymer resins that is compatible with the matrix resin used to resin infuse the preform 20 after it has been placed on a tool. The stitch material has a melt temperature that results in melting of the stitches 26 during thermal curing of the matrix resin following resin infusion of the dry fiber preform 20. For example, the stitch material used to stitch the layers 24a, 24b, 24c together as a dry fiber preform 20 may comprise a thermoplastic resin such as, without limitation, PEI (polyetherimide) PPS (polyphenylene sulphide), PES (polyethersulfone), PEEK (polyetheretherketone), PEKK (polyetheretherketone), and PEKK-FC (polyetherketoneketone-fc grade), which has a relatively low melt temperature that is within the range of temperatures required to cure the matrix resin used in a resin infusion process.

Figure 11:
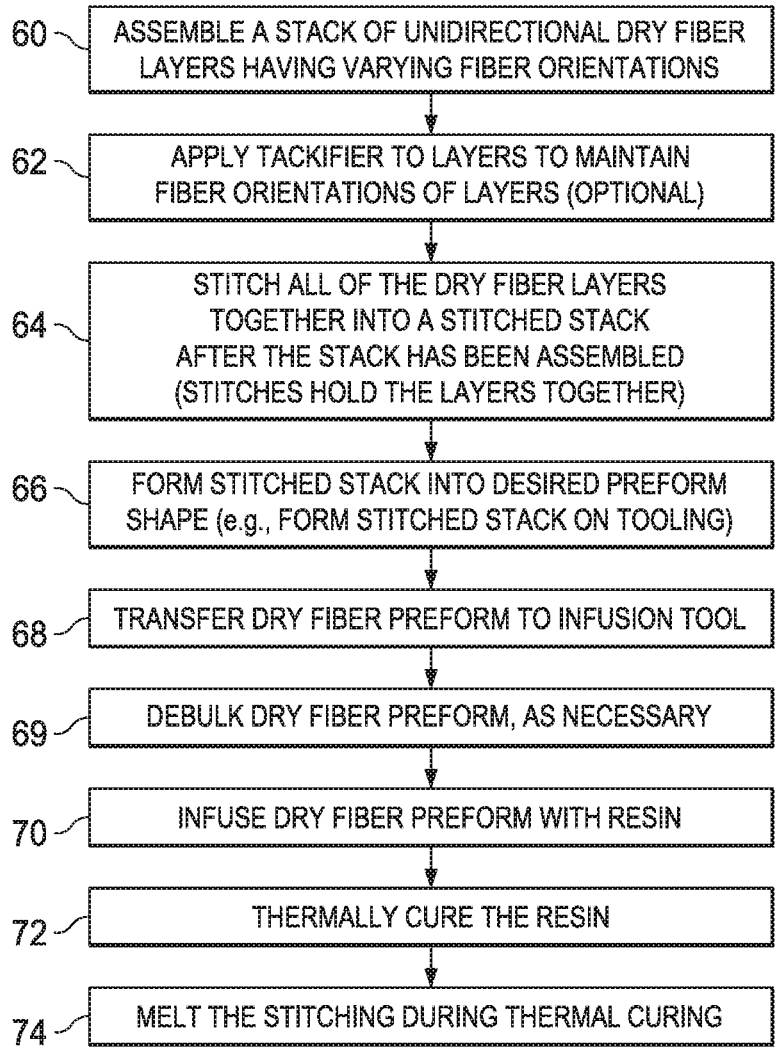
FIG. 11 is an illustration of a flow diagram of an alternate method of fabricating a composite structure using a stitched, dry fiber preform.

FIG. 11 broadly illustrates the steps of a method of fabricating a composite structure using resin infusion of a dry fiber preform 20. Beginning at step 60, a stack of unidirectional dry fiber layers 24a, 24b, 24c is assembled, in which the layers have varying fiber orientations. At step 62, optionally, a tackifier may be applied to the layers 24a, 24, 24c in order to assist in maintaining their respective fiber orientations. At 64, the dry fiber layers 24a, 24b, 24c are stitched together into a stitched stack 22, after the stack 22 has been assembled. The stitches 26 hold the layers 24a 24b, 24c of the stack together. At 66, the stitched stack 22 of dry fiber layers may be formed into a desired preform shape.

Forming the stack 22 may be performed by forming the stack 22 onto tooling, either before or after the stack 22 has been stitched. Where the stack 22 is stitched before it is formed to a desired shape, and the tooling has one or more contours, the stitching 26 may allow the dry fiber layers 24a 24b, 24c to slip slightly relative to each other in order to better allow the layers to conform to contoured surfaces of the tool. Depending upon the type of resin infusion process being used, the dry fiber preform 20 may be transferred to a resin infusion tool at step 68. In some embodiments, the tool on which the dry fiber layers 24a, 24b, 24c are formed into the shape of the preform 20 may be the tool that is used during the resin infusion process. At step 70, the dry fiber preform 20 is infused with resin, and at 72, the resin is thermally cured. The stitches 26 assist in holding the layers 24a, 24b, 24c in their desired orientations and in spaced apart relationship to each other as the preform 20 is debulked, consolidated and infused with resin. At step 74, the stitching 26 that is used to hold the layers of the preform 20 together, melts and dissolve into the resin used to infuse the preform 20.

Embodiments of the disclosure may find use in a variety of potential applications, particularly in the transportation industry, including for example, aerospace, marine, automotive applications and other application where composite laminate structures, particularly those that are contoured and are fabricated in relatively high volume. Thus, referring now to FIGS. 12 and 13, embodiments of the disclosure may be used in the context of an aircraft manufacturing and service method 76 as shown in FIG. 12 and an aircraft 78 as shown in FIG. 13. Aircraft applications of the disclosed embodiments may include, for example, without limitation, composite laminate frame sections, spars, stringers and beams, to name only a few. During pre-production, exemplary method 76 may include specification and design 80 of the aircraft 78 and material procurement 82. During production, component and subassembly manufacturing 84 and system integration 86 of the aircraft 78 takes place. Thereafter, the aircraft 78 may go through certification and delivery 88 in order to be placed in service 90. While in service by a customer, the aircraft 76 is scheduled for routine maintenance and service 92, which may also include modification, reconfiguration, refurbishment, and so on.

Each of the processes of method 76 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 78 produced by exemplary method 76 may include an airframe 94 with a plurality of systems 96 and an interior 98. Examples of high-level systems 96 include one or more of a propulsion system 100, an electrical system 102, a hydraulic system 104 and an environmental system 106. Any number of other systems may be included. Although an aerospace example is shown, the principles of the disclosure may be applied to other industries, such as the marine and automotive industries.

Systems and methods embodied herein may be employed during any one or more of the stages of the production and service method 76. For example, components or subassemblies corresponding to production process 84 may be fabricated or manufactured in a manner similar to components or subassemblies produced while the aircraft 76 is in service. Also, one or more apparatus embodiments, method embodiments, or a combination thereof may be utilized during the production stages 84 and 86, for example, by substantially expediting assembly of or reducing the cost of an aircraft 76. Similarly, one or more of apparatus embodiments, method embodiments, or a combination thereof may be utilized while the aircraft 76 is in service, for example and without limitation, to maintenance and service 92.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fabricating a composite structure, the method comprising:
    laying up a dry fiber preform having dry fiber layers;
    stitching the dry fiber layers together with thermoplastic threads into a stitched stack of dry fiber layers having varying fiber orientations;
    infusing the stack of dry fiber layers with a polymer resin;
    thermally curing the stitched stack of dry fiber layers;
    melting the thermoplastic threads after resin infusion is commenced to produce a matrix resin, wherein melting the thermoplastic threads takes place during thermal curing of the stitched stack of dry fiber layers, wherein the thermoplastic threads begin to melt and dissolve into the polymer resin only after a viscosity of the polymer resin begins to increase as the polymer resin begins to harden during an initial stage of curing; and wherein a vacuum is used to debulk the layers together without movement while the stitches melt into the resin and the structure cures and consolidates; and
    subjecting the stack of dry fiber layers, the polymer resin, and the thermoplastic threads with pressure causing the thermoplastic threads and the resin to mix together.

2. The method of claim 1, wherein the stack has a thickness, and stitching the dry fiber layers together is performed by using the thermoplastic threads that pass substantially through the thickness of the stack.

3. The method of claim 1, further comprising:
    forming the stack of dry fiber layers into a desired shape corresponding to a shape of the composite structure before stitching the dry fiber layers together.

4. The method of claim 1, wherein forming the stack of dry fiber layers includes placing the stack in a mold, and infusing the stack of dry fiber layers includes introducing a polymer resin into the mold under a vacuum.

5. The method of claim 1, wherein the stitching the dry fiber layers together with thermoplastic threads into a stitched stack of dry fiber layers having varying fiber orientations is performed prior to curing of the polymer resin.

6. The method of claim 1, wherein melting of the thermoplastic stitches during a cure process effectively dissolves the stitches and avoids crimping between the stitches and reinforcing fibers.

7. The method of claim 6, wherein dissolution of the thermoplastic stitches reduces or eliminates stress concentrations in a cured stack of fiber layers caused by fiber crimping.

8. The method of claim 7, wherein the dissolution of the thermoplastic stitches improves a mechanical performance of the composite structure and reduces crack propagation through the composite structure.

9. The method of claim 1, wherein the thermoplastic stitches have a melt temperature that is below a cure temperature of the polymer resin.

10. The method of claim 1, wherein the melted thermoplastic stitches are distributed generally uniformly across the stack of fiber layers.

11. The method of claim 1, wherein:
    each of the fiber layers includes a resin matrix, and
    the melted thermoplastic stitches are compatible with the resin matrix.

12. The method of claim 11, wherein:
    the resin matrix is a thermoset resin, and
    the thermoplastic stitches comprise a thermoplastic resin.

13. The method of claim 1, wherein each of the layers including unidirectional reinforcing fibers.

14. The method of claim 1, wherein the thermoplastic threads melt when heated to a predetermined temperature.

15. The method of claim 1, further comprising:
    varying a tightness of the stitches depending upon a number of plies in the stack and a complexity of a dry fiber structure being fabricated so that for a highly contoured composite structure relatively loose stitches are made in order to allow the number of plies to slip slightly in-plane relative to each other as they are being formed over a tooling and allow the stack to better conform to contoured tool surfaces and avoid ply wrinkling and bunching.

16. The method of claim 1, wherein the polymer resin is selected such that the stitched stack of dry fiber layers assists in toughening the matrix resin and increases mechanical properties of a cured composite structure of the matrix resin.

17. The method of claim 16, wherein the mechanical properties include impact resistance.

18. The method of claim 1, wherein stitching comprises extending the thermoplastic stitches diagonally through a thickness of the stitched stack.

19. The method of claim 1, wherein a thermoplastic material of each stitch comprises a thermoplastic resin selected from a group consisting of PEI (polyetherimide) PPS (polyphenylene sulphide), PES (polyethersulfone), PEKK (polyetheretherketone), and PEKK-FC (polyetherketoneketone-fc grade).

20. The method of claim 1, wherein each stitch comprises a thermoplastic material that has a melt temperature of about 150 degrees.

* * * * *